United States Patent [19]

Yamamoto

[11] 4,274,461

[45] Jun. 23, 1981

[54] ASSEMBLY-TYPE TIRE PROTECTOR

[75] Inventor: Satoshi Yamamoto, Yokohama, Japan

[73] Assignee: Mitsubishi Seiko Kabushikikaisha, Tokyo, Japan

[21] Appl. No.: 953,618

[22] Filed: Oct. 23, 1978

Related U.S. Application Data

[63] Continuation-in-part of Ser. No. 740,966, Nov. 11, 1976, abandoned.

[30] Foreign Application Priority Data

Jun. 23, 1976 [JP] Japan .................................. 51-73293

[51] Int. Cl.³ ............................................. B60C 27/00
[52] U.S. Cl. ..................................... 152/167; 24/363;
29/512; 29/522 R; 59/93; 152/187; 152/191;
152/239; 152/244; 403/276; 403/381; 411/49
[58] Field of Search ............... 152/231, 239, 179, 182,
152/187, 172, 189, 191, 242; 89/26, 31;
403/248, 249, 251, 277, 315, 317, 276, 280, 281,
381; 59/86, 93; 24/73 AC, 73 CE, 73 HA, 73
HL; 29/512, 522 R

[56] References Cited

U.S. PATENT DOCUMENTS

| 268,207 | 11/1882 | Edmonds | 85/79 |
|---|---|---|---|
| 751,902 | 2/1904 | Dodge | 85/82 |
| 886,515 | 5/1908 | Jude | 85/26 X |
| 1,469,667 | 10/1923 | Pleister | 85/72 |
| 2,899,672 | 8/1959 | Lewis | 85/72 X |
| 2,963,935 | 12/1960 | Shields | 85/72 X |
| 3,595,292 | 7/1971 | Muller | 152/243 |
| 3,835,908 | 9/1974 | Rieger et al. | 152/243 |
| 4,020,885 | 5/1977 | Sato | 152/241 X |

FOREIGN PATENT DOCUMENTS 1090530 10/1960 Fed. Rep. of Germany ............ 152/243

Primary Examiner—John T. Goolkasian
Assistant Examiner—Thomas Bokan
Attorney, Agent, or Firm—Birch, Stewart, Kolasch & Birch

[57] ABSTRACT

The present invention relates to an assembly-type tire protector comprising a plurality of annular members disposed substantially parallel to the tire surface and a plurality of link members disposed substantially perpendicular to the tire surface, said annular members being connected together by said link members to form a net, each of said link members comprising a body which is provided at both of its ends with opposing hook-like arm means for interconnecting said annular members, said opposing hook-like arm means defining an opening, a pin disposed upright in said body, said pin having a head portion and a base portion, said head portion substantially occupying said opening, said body of the link member containing a blind hole for receiving said base portion of the pin, and means disposed in said hole for expanding said base portion of the pin within said hole for locking said pin in position in said hole.

10 Claims, 14 Drawing Figures

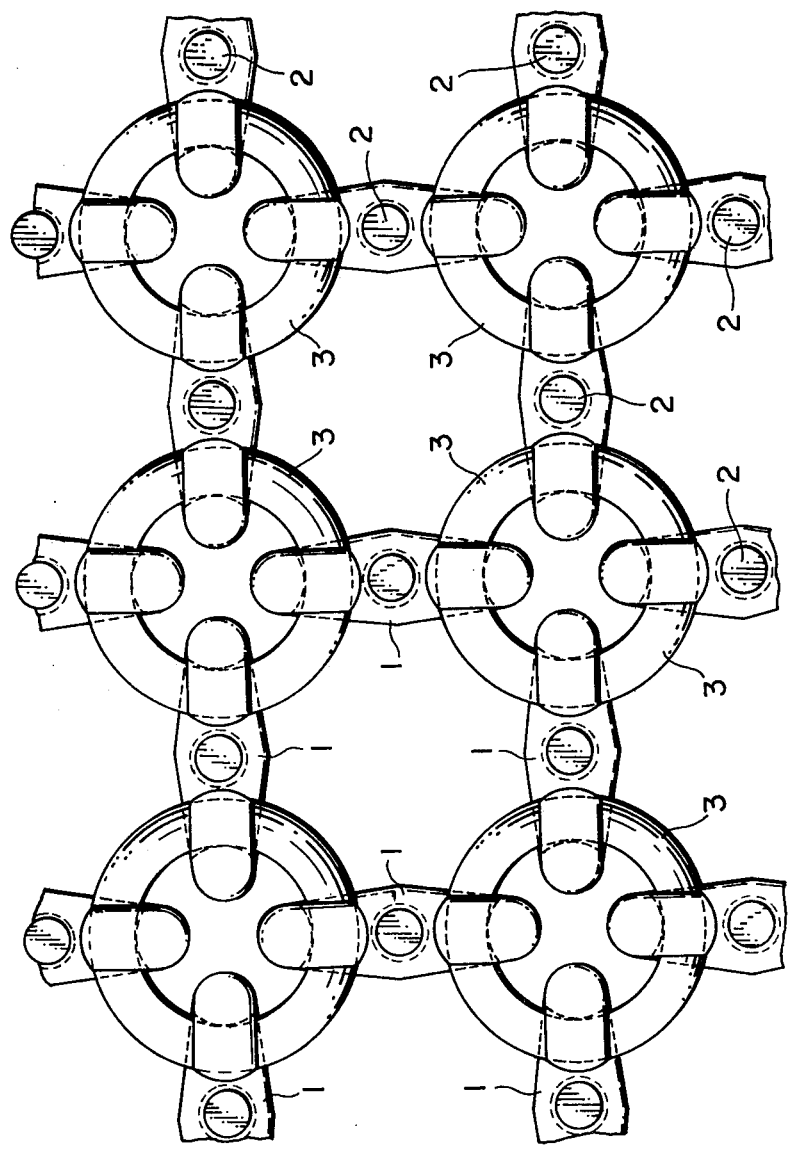
FIG. I

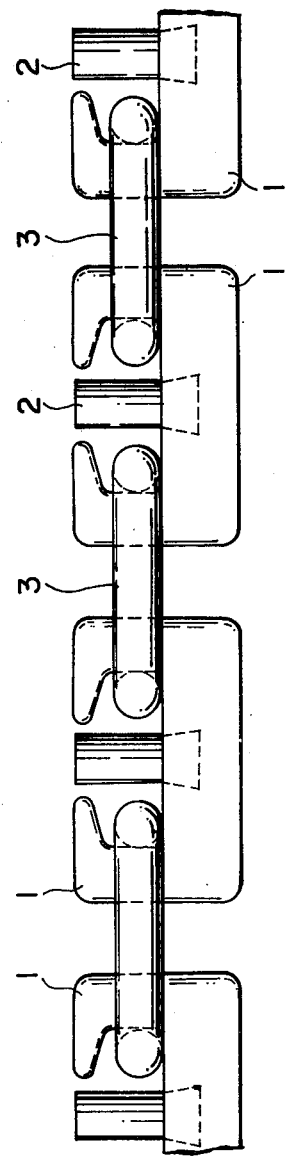
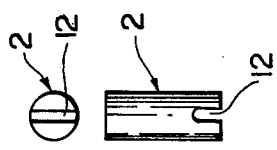
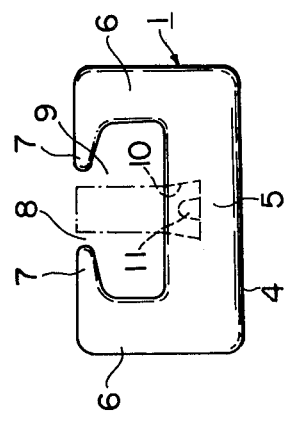

FIG. II
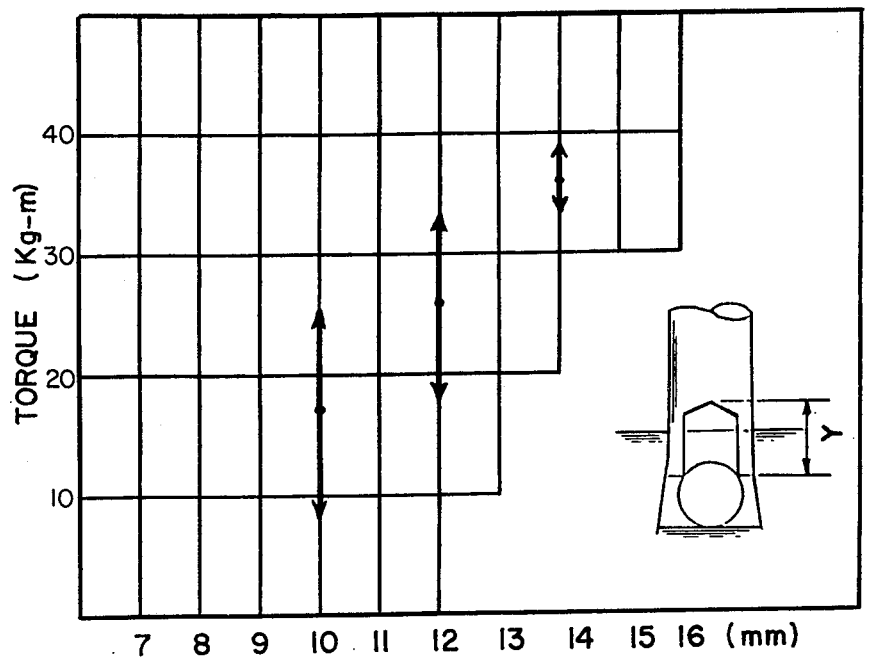
FIG. 12
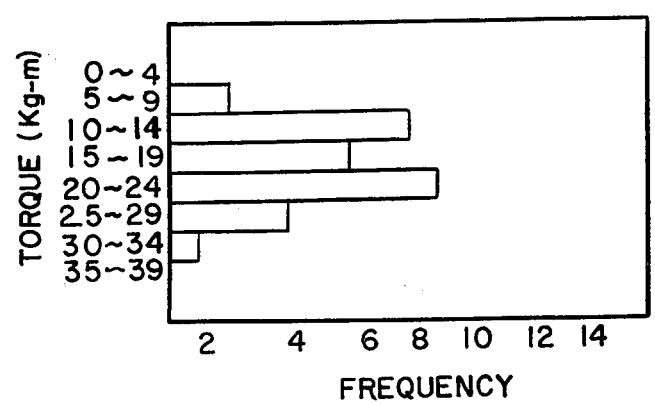

ASSEMBLY-TYPE TIRE PROTECTOR

BACKGROUND AND SUMMARY OF THE INVENTION

The present application is a continuation-in-part application of co-pending application Ser. No. 740,966, filed on Nov. 11, 1976 now abandoned.

The present invention relates to an assembly-type tire protector to be used for the protection or slip prevention of automobile tires and designed to be assembled without using welding means.

For working cars running on a gravel road or a rough road, a net-like steel tire protector has been used for the protection and slip prevention of the tire. Conventional tire protectors are broadly classified into two kinds according to the fabrication method; that is, the welding type and the assembly type. The welding type involves various shapes, but basically a multitude of forged links are connected together through the welding of O-rings. In tire protectors of this kind, generally in use, forged links are arranged perpendicularly to the tire surface and O-rings are arranged parallel to the tire, so that the forged links contact both the tire and the ground and the height thereof is reduced due to up and down wear. On the other hand, O-rings undergo wear at the portion where they are in contact with the forged links, for which reason the hardness of the O-ring should approximate, insofar as possible, the hardness of the forged link. However, in the case of the O-ring an excellent weldability is considered to be a necessary property in the selection of material and, therefore, the wear resistance, which is a very important property for tire protectors, is sacrificed. Additionally, in the case of the welding type, it is necessary to remove the strain from the welded portion and, in order for the welded portion to be endowed with the effects of heat treatment, the whole of the assembled net must be heat-treated. As set forth hereinabove, however, since forged links and O-rings are made of different materials, their optimum conditions for heat treatment are different, and thus it is impossible to establish heat treatment conditions which would be appropriate for the whole.

The assembly-type tire protector has been devised in order to eliminate the drawbacks associated with the welding type. That is, if each member is assembled without welding into a net-like construction, materials excellent in wear resistance can be used regardless of the weldability properties. Thus, since each member can individually be heat treated, a heat treatment, e.g., a partial induction hardening which is optimum to each material, can be applied and consequently it is possible to obtain a product which, as a whole, is excellent in wear resistance.

As assembly-type tire protectors of this kind, there have been proposed those disclosed in Japanese Patent Publication Nos. 9122/1973 (U.S. Pat. No. 3,602,285), 9123/1973 (U.S. Pat. 3,574,316, 9121/1973 (U.S. Pat. No. 3,696,853), and 48682/1974 (U.S. Pat. No. 3,766,955). In these tire protectors, the members used are different in shape, but basically they are of an assembly mechanism in which constituent members are hooked to each other by the utilization of hooks. Consequently, if one of the members is broken, the entire net becomes separated and disjointed. For this reason, it is essential to discover and repair the breakage at an early stage. Moreover, for repair, it is necessary either to use parts of a special shape as repair parts, or to disjoint the whole and reassemble from the beginning.

Among assembly-type tire protectors, there is one which utilizes connecting links to prevent a partial breakage from leading to separation and disjointing of the entire net (see in this regard, Japanese Patent Publication No. 13721/1974, U.S. Pat. No. 3,614,971). However, in this well-known art, detachable connecting links are used, and thus the attaching and detaching property of the pin is emphasized and not much consideration is given to preventing the pin from coming off in use.

The assembly-type tire protector of the present invention is a completely novel device which eliminates the foregoing drawbacks or problems associated with the prior art. The assembly of the present invention is characterized by the following features.

(a) Materials excellent in wear resistance can be used regardless of weldability;

(b) With respect to each individual member, it is possible to apply a heat treatment on the basis of an optimum condition and an optimum method;

(c) The pin mounted in the link member does not come off easily while in use;

(d) Even if a member is broken in use, its breakage does not extend to the entire unit, nor does it cause a critical breakage;

(e) Repair of a broken part does not require any special repair parts, and it can be done in a minor portion by use of the same part; and (f) Repair can be done solidly by a simple operation and there is no fear of disconnection after repair.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 is a fragmentary plan view showing an embodiment of the present invention.

FIG. 2 is a front view thereof;

FIG. 3 is a front view of the body of a link member;

FIG. 4 shows a front view and a bottom view of the pin to be fitted in the body of the link member;

FIG. 11 shows the relationship between the depth of the cylindrical hole of the pin and the torque thereof; and FIG. 12 shows the results of the measurements of the torque of the pins.

DESCRIPTION OF THE PREFERRED EMBODIMENTS

Figure 5A:
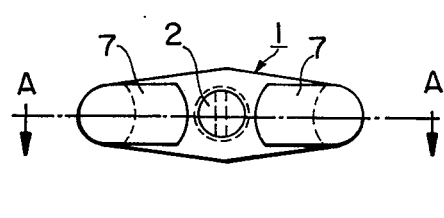
FIGS. 5A and 5B show an assembled link member of the present invention, FIG. 5A being a front view, and FIG. 5B being a sectional view taken along line A—A of FIG. 5A.

FIG. 1 is a fragmentary plan view of the assembly-type tire protector of the present invention. FIG. 2 is a side view of FIG. 1. As is apparent from these figures, the tire protector of the present invention is composed of an annular member 3 which is to be arranged approximately parallel to the tire surface, and a link member comprising a body member 1 and a pin 2. The pin is arranged approximately perpendicular to the tire surface. A plurality of these members are connected together in the form of a net.

To be more specific, FIG. 3 shows the body 1 of the link member which comprises a horizontal portion 5 having a ground contact face 4 and hook portions 6 for hooking the annular members. The hook portions 6 project upwardly from both ends of the horizontal portion 5 and then extend horizontally, inwardly to form bent portions 7, the opposing tip ends of the bent portions 7 defining a first opening gap 8 having a size through which the annular members 3 are free to pass. The horizontal portion 5, hook portions 6 and the bent portions 7 define a second opening 9 so that the second opening is surrounded by these elements. A blind hole 10 is formed in the central portion of the upper surface of the horizontal portion 5. The sectional area of the blind hole is smallest at its opening portion and gradually increases at its innermost portion, thereby having a generally trapezoidal shape. On the bottom of the hole 10 is placed a wedge 11.

FIG. 4 illustrates the pin 2 of the link member in which the pin is provided at its lower end with a slit or groove 12. The diameter of the pin 2 is, of course, smaller than the first opening 8 in the body 1, but is advantageously large enough so that when the pin is mounted upright in the blind hole 10 of the body 1, its head virtually obstructs the first opening 8. The length of the pin is such that when it is mounted upright, the top thereof is coplanar with the upper surface of the bent portion 7 of the body 1.

Figure 5B:
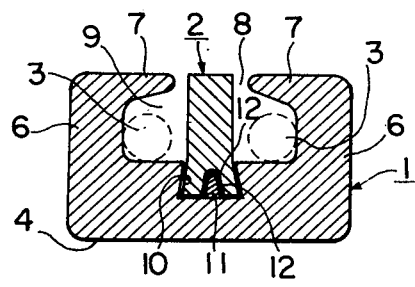

The mode of use of the link member consisting of the body 1 and the pin 2 will now be explained. FIG. 5A is a plan view showing the link member in use, and FIG. 5B is a sectional view taken along line A—A of FIG. 5A. First the annular members 3 are suspended in the hook portions 6 through the first opening 8 and then the pin 2 is placed in the blind hole 10 through the first opening 8 and forced in by some appropriate means, thereby causing the slit groove or aperture 12 formed in the tip end of the pin 2 to be expanded by the wedge 11 disposed in the blind hole 10. The wedge is generally larger than the size of the aperture, thereby causing an expansion in the base of the pin. The pin 2 is also tightly anchored between the divergent circumferential wall and the wedge 11 in the blind hole 10, which causes the pin 2 to stand up firmly. Since the top of the pin 2 is virtually coplanar with the bent portion 7 of the body 1 and virtually obstructs the first opening 8, the annular members 3 hooked within the second opening 9 cannot come off. Following the above procedure, assemblage is made in sequence to form the net-like protector as shown in FIGS. 1 and 2.

Figure 6A:
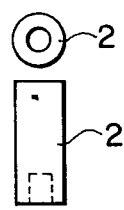
FIGS. 6A and 6B show another embodiment of the link member of the present invention, FIG. 6A showing a front view and a bottom view of the pin, and FIG. 6B being a longitudinal, sectional view of the assembled link member.
Figure 6B:
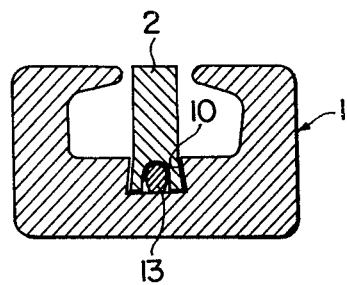

FIGS. 6A and 6B show another embodiment of an improved link member. In FIG. 6A, the pin 2 is cylindrical at its tip end, while in FIG. 6B, the wedge 13 in the blind hole 10 of the body 1 has a spherical shape. Thus, the cylindrical portion of the tip end of the pin 2 is fitted over the spherically-shaped wedge 13. In the embodiment shown in FIGS. 3 to 5, the tip end of the pin 2 is in the form of a split groove 12 and the wedge 11 in the blind hole 10 of the body 1 is also correspondingly shaped so that the fit of the wedge in the groove requires an alignment of the two elements. However, in the embodiment of FIG. 6, such a troublesome operation is dispensed with.

Figure 7:
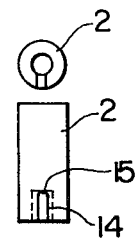
FIG. 7 shows a front view and a bottom view of another embodiment of the pin of the present invention.

However, in the embodiment of FIG. 6, when forcing in the pin 2, it is possible that the expanded portion may become cracked. Since the tip end of this crack forms an acute angle, it is possible that the crack will become larger due to the fatigue of the material while in use as a tire protector. However, such a crack can be prevented if, as shown in FIG. 7, a notch 14 is preformed in part of the cylindrical portion of the tip end of the pin 2 and its end portion is shaped in the form of a circular arc 15.

Figure 8:
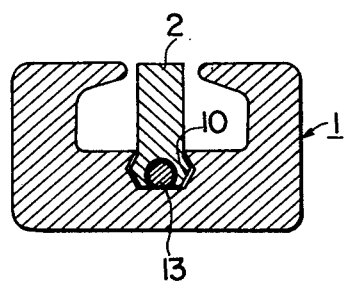
FIG. 8 is a longitudinal, sectional view of another embodiment of the link member of the present invention.

FIG. 8 illustrates another embodiment of an improved link member, in which the sectional area of the blind hole 10 of the body 1 is reduced at its opening portion, increased at its intermediate portion, and thereafter reduced at its lower portion. With such a construction, the spherical wedge 13 in the blind hole 10 is wrapped completely within the cylindrical portion of the tip end of the pin 2, whereby the pin 2 is prevented from coming off and thus a more secure coupling is achieved.

Figure 9:
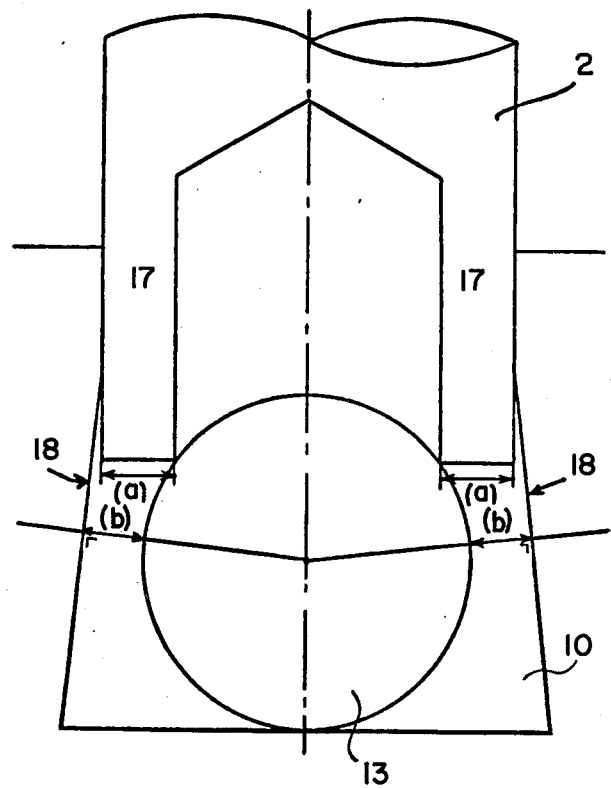
FIGS. 9 and 10 show how the pin of the connecting link fits into the body portion of the connecting link prior to and after it is forced into position.
Figure 10:
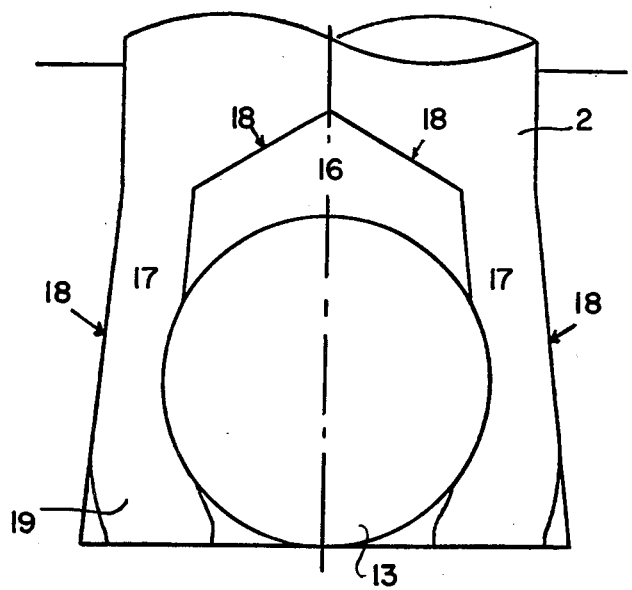

FIGS. 9 and 10 show still a further embodiment of the present invention. In FIGS. 9 and 10, the hole of the cylindrical portion of the tip end of the pin is deep enough to provide a vacant portion 16 above the spherical wedge 13 when the pin is sufficiently forced into the blind hole 10 as shown in FIGS. 9 and 10 of the present application.

FIG. 9 shows the configuration of the pin 2 and the blind hole 10 just before the pin 2 is forced into the blind hole 10. In the figure, $a$ represents the thickness of the cylindrical portion 17 of the pin 2, and $b$ represents the shortest distance between the inner wall 18 of the blind hole 10 and the spherical wedge 13. The greater the ratio of $a$ to $b$, the greater the friction force or torque moment between the pin 2 and the blind hole 10. The torque moment is the force necessary to loosen the pin 2 within the blind hole 10. However, when the thickness $a$ is too great in comparison with the distance $b$, the pin 2 cannot be forced into the blind hole 10 in sufficient depth. For an ideal mounting of the pin 2 in the blind hole 10, a high accuracy of the size of the blind hole 10 is required.

FIG. 10 illustrates the case where a vacant portion 16 is maintained above the spherical wedge 13 when the pin 2 is sufficiently forced into the blind hole 10.

In the case of such a design of the pin 2, a large portion of the energy used in mounting the pin 2 in the blind hole 10 is used for forcing the cylindrical portion of the pin 2 into the blind hole 10, and when the pin 2 is forced into the blind hole 10, the free end portion 19 of the cylindrical portion 17 between the inner wall 18 of the blind hole 10 and the spherical wedge 13 becomes thicker because the cylindrical portion is depressed. Thus, even if the thickness $a$ is smaller than the distance $b$, the pin 2 can be fixedly forced into the blind hole 10, whereby the pin 2 is secured to the blind hole 10 and becomes immovable when it is mounted in the blind hole.

If the pin is movable after being mounted in the blind hole 10, some sand or the like may tend to collect in the gap between the blind hole 10 and the pin 2, and thus the blind hole 10 and the pin 2 will become worn by the sand or the like, with the result that the pin 2 gradually becomes thinner and the blind hole 10 gradually becomes larger with the result that the pin 2 eventually falls off.

FIG. 11 shows the relationship between the depth of the cylindrical hole of the pin 2 and the torque required to loosen the pin after it is secured. As can be seen from FIG. 11, the deeper the hole, the more stably the pin 2 is secured to the blind hole 10 and the more the average value of the respective torques necessary to loosen the pin 2.

FIG. 12 shows the results of a measurement of the torques of the pins which did not become loosened even after being in use for 1000 hours.

The size of the base portion of the blind hole 10 is larger than the size of the entrance to the hole 10. At the same time, the base portion of the blind hole 10 is flat. This is because in the case of a vertical-type blind hole, i.e., when the entrance and the bottom of the hole are the same size, as shown in FIG. 3 of U.S. Pat. No. 751,902 to Dodge, the pin 2 tends to come off while in use. Furthermore, in the case where the bottom portion of the blind hole is larger than the entrance of the blind hole, but the bottom is concave as in FIG. 16 of the Dodge patent, the cylindrical portion of the pin may not completely hold the spherical wedge down to the bottom portion of the wedge when it is forced into the hole since the spherical wedge at least partially extends into the concave portion of the hole.

As set forth hereinabove, the present invention is of an extremely simple construction, and at the same time is solidly assembled. Thus, it is not likely that the pin will come off and be damaged while in use. Even if the pins are partially broken, they will never lead to separation and disjointing of the entire construction and the broken parts can be repaired in a simple manner. Thus, the present invention is very useful as a protector for various tires.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An assembly-type tire protector comprising a plurality of weld free annular members disposed substantially parallel to the tire surface and a plurality of link members disposed substantially perpendicular to the tire surface, said annular members having an uninterrupted, uniform continuous surface and each of said annular members being connected together to the next adjacent annular member by said link members to form a net, said link members being uniformly distributed throughout the net, each of said link members comprising a body which is provided at both of its ends with opposing hook-like arms and bent portions for interconnecting said annular members, said opposing hook-like arms and said bent portions defining an opening, a pin disposed upright in said body, said pin having a head portion and a base portion, and the top of said pin being substantially coplanar with the bent portions of said body, said head portion substantially occupying said opening, said body of the link member containing a blind hole including a substantially flat bottom portion for receiving said base portion of the pin, and expanding means disposed in said hole for expanding said base portion of the pin within said hole for locking said pin in position in said hole around a portion of said expanding means, said base portion of said pin including an aperture and said means for expanding said base portion being a wedge means for expanding the aperture and said base portion to a size larger than the entrance to said blind hole.

2. The assembly-type tire protector of claim 1, wherein said wedge means is secured to the base of said hole.

3. The assembly-type tire protector of claim 2, wherein the cross-sectional area of the hole increases from the entrance to the base of the hole.

4. The assembly-type tire protector of claim 3, wherein the hole has a trapezoidal shape with the entrance to the hole being the smallest side of the trapezoid.

5. The assembly-type tire protector of claim 2, wherein the cross-sectional area of the hole increases from the entrance to the mid-point of the hole and then decreases from the mid-point to the base of the hole.

6. The assembly-type tire protector of claim 1, wherein the aperture in the base portion of the pin is a groove and the wedge means has a general shape which corresponds to the groove.

7. The assembly-type tire protector of claim 1, wherein the aperture in the base portion of the pin is spherical and the wedge has a spherical shape.

8. The assembly-type tire protector of claim 7, wherein the aperture in the base portion of the pin is provided with a notch which extends to the surface of the pin.

9. The assembly-type tire protector of claim 1, wherein the size of the wedge is larger than the size of the aperture, thereby causing an expansion in the base of the pin.

10. An assembly-type tire protector comprising a plurality of weld free annular members disposed substantially parallel to the tire surface and a plurality of link members disposed substantially perpendicular to the tire surface, said annular members having an uninterrupted, uniform continuous surface and each of said annular members being connected together to the next adjacent annular member by said link members to form a net, said link members being uniformly distributed throughout the net, each of said link members comprising, in combination, a body portion being provided at both ends with opposing hook-like arms and bent portions, said hook-like arms and said bent portions defining an opening therebetween, said body portion containing a blind hole including a substantially flat bottom and expanding means disposed in said blind hole, a pin means having a head portion and a base portion, said base portion containing an aperture for mounting on said expanding means in an upright position in said body portion with said head portion being substantially coplanar with the bent portions and substantially occupying the opening between said opposing hook-like arms and said bent portions, said blind hole in said base portion being of sufficient depth so that a vacant area remains above the expanding means when the pin is sufficiently forced into the blind hole in the body of the link member around the expanding means for expanding said base portion of said pin within said hole, thereby locking said pin in position within said blind hole around a portion of said expanding means, said blind hole including said substantially flat bottom portion and an entrance, the size of said substantially flat bottom portion being larger than the size of the entrance of said blind hole, said expanding means being a spherical wedge member and a portion of said pin means extending beneath said spherical wedge as said pin is forced into said blind hole.

* * * * *